(12) United States Patent
Boloorian et al.

(10) Patent No.: US 11,262,453 B2
(45) Date of Patent: Mar. 1, 2022

(54) SEPARATION OF LIDAR CHANNELS FROM A COMMON SIGNAL

(71) Applicant: SiLC Technologies, Inc., Monrovia, CA (US)

(72) Inventors: Majid Boloorian, San Diego, CA (US); Dazeng Feng, El Monte, CA (US); Bradley Jonathan Luff, La Canada Flintridge, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 227 days.

(21) Appl. No.: 16/660,756

(22) Filed: Oct. 22, 2019

(65) Prior Publication Data

US 2020/0142065 A1 May 7, 2020

Related U.S. Application Data

(60) Provisional application No. 62/754,345, filed on Nov. 1, 2018.

(51) Int. Cl.
| | |
|---|---|
| *G01C 3/08* | (2006.01) |
| *G01S 17/34* | (2020.01) |
| *G01S 7/481* | (2006.01) |
| *G01S 17/00* | (2020.01) |

(52) U.S. Cl.
CPC .............. *G01S 17/34* (2020.01); *G01S 7/481* (2013.01); *G01S 17/003* (2013.01)

(58) Field of Classification Search
CPC ......... G01S 17/34; G01S 17/003; G01S 7/481
See application file for complete search history.

(56) References Cited

U.S. PATENT DOCUMENTS

| | | | |
|---|---|---|---|
| 8,541,744 B1 | 9/2013 | Liu | |
| 8,558,993 B2 * | 10/2013 | Newbury | ................ G01S 17/10 |
| | | | 356/4.1 |

FOREIGN PATENT DOCUMENTS

| | | | | |
|---|---|---|---|---|
| CN | 107192355 B | * | 8/2019 | ............. G01B 11/26 |
| CN | 112241014 A | * | 1/2021 | ............. G01S 7/481 |
| WO | 2018/160240 A1 | | 9/2018 | |

OTHER PUBLICATIONS

Young, Lee, International Search Report and Written Opinion, United States Patent and Trademark Office, PCT/US19/57500, dated Jan. 16, 2020.

(Continued)

*Primary Examiner* — Mark Hellner
(74) *Attorney, Agent, or Firm* — Gavrilovich, Dodd & Lindsey LLP

(57) ABSTRACT

A LIDAR system includes a reference light source configured to generate an outgoing light signal that includes multiple reference channels that each has a different frequency. The system also includes a comparative light source configured to generate an outgoing light signal that includes multiple comparative channels. Each of the comparative channels has a different frequency. The comparative channels are each associated with one of the reference channels in that LIDAR data is generated for a sample region on a field of view using a comparative channel and the associated reference channel. The comparative channel and the associated reference channel have different frequencies.

21 Claims, 9 Drawing Sheets

(56) References Cited

OTHER PUBLICATIONS

Zhu et al., "Dual-Comb Ranging", Engineering, 4, Oct. 26, 2018, pp. 772-778.
Lee, Sun Hwa, International Preliminary Report on Patentability and Written Opinion, The International Bureau of WIPO, PCT/US19/57500, dated May 14, 2021.

* cited by examiner

US 11,262,453 B2

SEPARATION OF LIDAR CHANNELS FROM A COMMON SIGNAL

RELATED APPLICATIONS

This patent application claims the benefit of U.S. Patent Application Ser. No. 62/754,345, filed on Nov. 1, 2018, entitled "Separation of LIDAR Channels from a Common Signal" and incorporated herein in its entirety.

FIELD

The invention relates to optical devices. In particular, the invention relates to LIDAR systems.

BACKGROUND

LIDAR technologies are being applied to a variety of applications. LIDAR specifications typically specify that LIDAR data be generated for a minimum number of sample regions in a field of view. LIDAR specifications also specify the distance of those sample regions from the LIDAR signal source and a re-fresh rate. The re-fresh rate is the frequency at which the LIDAR data is generated for all of the sample regions in the field of view. The ability of the given LIDAR system to generate the LIDAR data for the sample regions in the field of view becomes more difficult as the distance to the sample regions increases and as the refresh rate increases.

As LIDAR is being adapted to applications such as self-driving-vehicles, it becomes more desirable to generate LIDAR data for larger fields of view, increasing numbers of points, further distances, and at faster re-fresh rates. As a result, there is a need for a LIDAR system that capable of generating LIDAR data for larger numbers of sample regions.

SUMMARY

A LIDAR system includes a reference light source configured to generate an outgoing light signal that includes multiple reference channels that each has a different frequency. The system also includes a comparative light source configured to generate an outgoing light signal that includes multiple comparative channels. Each of the comparative channels has a different frequency. The comparative channels are each associated with one of the reference channels in that LIDAR data is generated for a sample region on a field of view using a comparative channel and the associated reference channel. At least a portion of the comparative channels have a different frequency from the associated reference channel.

Another embodiment of a LIDAR system includes optical components configured to generate a composite signal that includes light from multiple different reference channels combined with light from multiple different comparative channels. The light from the comparative channels carries LIDAR data as a result of the light from the comparative channels being reflected by an object located apart from the LIDAR system. The light from the reference channels does not include light reflected by the object. A processing component is configured to separate an electrical signal into multiple different electrical LIDAR data signals that each carries the LIDAR data from a different one of the comparative channels.

BRIEF DESCRIPTION OF THE FIGURES

FIG. 5A is a schematic of the processing unit.

FIG. 5B illustrates the relationship between the frequencies associated with different channels in a data signal processed by the schematic of FIG. 5A.

FIG. 5C illustrates a schematic for an example of electronics that are suitable for use with a processing unit constructed according to FIG. 5A.

FIG. 6A is a schematic of the processing unit.

FIG. 6B illustrates the relationship between the frequencies associated with different channels in a data signal processed by the schematic of FIG. 6A.

FIG. 6C illustrates a schematic for an example of electronics that are suitable for use with a processing unit constructed according to FIG. 6A.

DESCRIPTION

The LIDAR system concurrently generates an outgoing light signal that includes multiple channels that are each of a different wavelength. The different channels are directed to different sample regions in a field of view and LIDAR data (distance and/or radial velocity between the source of a LIDAR output signal and a reflecting object) is generated for each of the sample regions. The concurrent use of multiple different channels to generate LIDAR data accelerates the generation of LIDAR data for a field of view and accordingly allows the LIDAR specifications to be satisfied for applications that require larger fields of view, increased numbers of sample regions, further field of view distances, and lower re-fresh rates.

Figure 1:
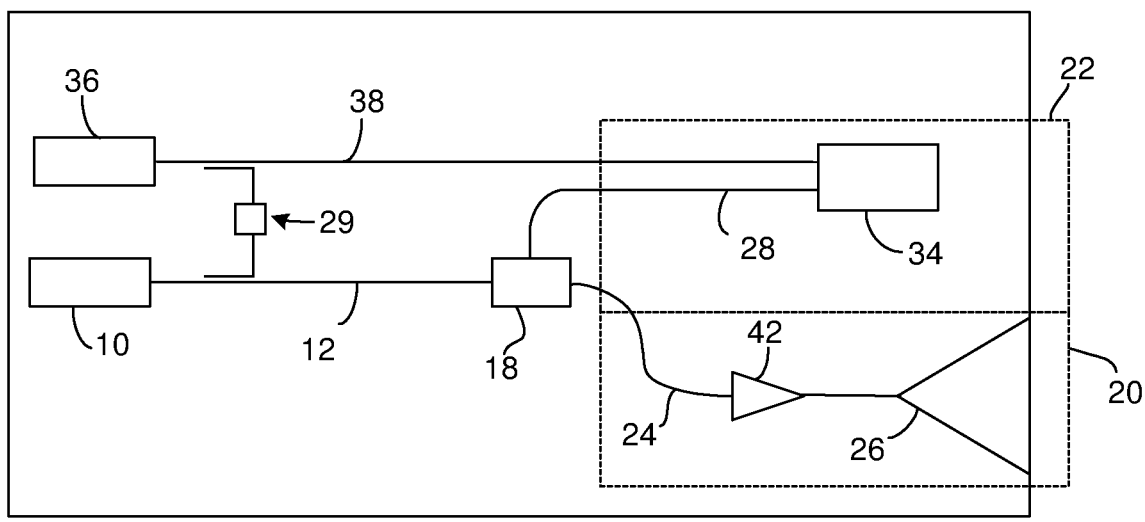
FIG. 1 is a schematic of a LIDAR system.

FIG. 1 is a schematic of a LIDAR system. The system includes a comparative light source 10 such as a laser that outputs an outgoing light signal. The outgoing light signal includes N+1 different comparative channels that are each at a different wavelength. The wavelengths of the comparative channels can be periodically spaced in that the wavelength increase from one comparative channel to the next comparative channel is constant or substantially constant. A suitable light source 10 for generating multiple comparative channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, granted U.S. Pat. No.

7,542,641, entitled "Multi-Channel Optical Device," and incorporated herein in its entirety.

The LIDAR system also includes a utility waveguide 12 that receives an outgoing light signal from the light source 10. The utility waveguide 12 carries the outgoing light signal to a signal-directing component 18. The signal-directing component 18 can direct the outgoing light signal to a LIDAR branch 20 and/or a data branch 22. The LIDAR branch outputs LIDAR output signals and receives LIDAR input signals. The data branch processes the LIDAR input signals for the generation of LIDAR data (distance and/or radial velocity between the source of the LIDAR output signal and a reflecting object).

The LIDAR branch includes a LIDAR signal waveguide 24 that receives at least a portion of the outgoing light signal from the signal-directing component 18. The LIDAR signal waveguide 24 carries at least a portion of the outgoing light signal to a demultiplexing component 26. When the outgoing light signal includes multiple different channels at different wavelengths, the demultiplexing component 26 separates the outgoing light signal into multiple LIDAR output signals that are each at a different wavelength (comparative channel). The demultiplexing component 26 outputs the LIDAR output signals such that the different LIDAR output signals travel away from the LIDAR chip in different directions. Accordingly, the different LIDAR output signals are directed to different sample regions in a field of view. The LIDAR output signals can each be reflected by a reflecting object (not shown) located apart from the LIDAR system. The different LIDAR output signals can be reflected by the same reflecting object or different reflecting object.

The reflected LIDAR output signals each returns to the demultiplexing component 26 as LIDAR input signals. After reflection, each of the LIDAR input signals carries preliminary LIDAR data. For instance, each LIDAR input signals carries data from which the LIDAR data (distance and/or radial velocity between the source of a LIDAR output signal and a reflecting object) can be generated. As an example, the frequency of a reflected LIDAR input signals can be a function of the (distance and/or radial velocity between the source of a LIDAR output signal and a reflecting object).

The demultiplexing component 26 combines the different LIDAR input signals and outputs the result on the LIDAR signal waveguide 24 as an incoming light signal. In some instances, the demultiplexing component 26 also includes beam steering functionality. In these instances, the demultiplexing component 26 can be in electrical communication with electronics (not shown) that can operate the demultiplexing component 26 so as to steer the LIDAR output signals to different sample regions in a field of view. The demultiplexing component 26 and/or electronics can be configured such that the different LIDAR output signals are steered independently or are steered concurrently.

Although the demultiplexing component 26 is illustrated as a single component, the demultiplexing component 26 can include multiple optical components and/or electrical components. Suitable demultiplexing components 26 include, but are not limited to, optical phased arrays (OPAs), transmission diffraction gratings, reflection diffraction gratings, and Diffractive Optical Elements (DOE). Suitable demultiplexing components 26 with beam steering capability include, but are not limited to, optical phased arrays (OPAs) with active phase control elements on the array waveguides.

The LIDAR signal waveguide 24 carries the incoming light signal to the signal-directing component 18. The signal-directing component 18 directs the incoming light signal to a comparative signal waveguide 28. The portion of the incoming light signal-directed to the comparative signal waveguide 28 serves a comparative light signal. The comparative signal waveguide 28 carries the comparative light signal to a processing component 34.

The system includes a reference light source 36 such as a laser that outputs a reference signal. The reference signal includes multiple different reference channels that are each at a different wavelength. The wavelengths of the reference channels can be periodically spaced in that the wavelength increase from one reference channel to the next reference channel is constant or substantially constant. A suitable reference light source 36 for generating multiple reference channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, grated U.S. Pat. No. 7,542,641, entitled "Multi-Channel Optical Device," and incorporated herein in its entirety.

The reference channels can each be associated with one of the comparative channels. The comparative channel and the associated reference channel can be an associated channel pair that are each associated with the same channel index i. The frequency of each comparative channel can be equal to the frequency of the corresponding reference channel plus a non-zero separation factor that can be positive or negative. As a result, the reference channel and the associated comparative channel have the same base frequency. The separation factor is selected to be different for each pair of associated channels. For instance, the frequency of comparative channel with channel index i ($fc_i$) can be $fc_i=fr_i+(i)df+OS$ or $fc_i=fr_i+(i+1)df+OS$ where i is an integer greater than or equal to 0, OS is a constant that can be equal to zero, $fr_i$ represents the frequency of reference channel i, df represents the increase in the separation factor for adjacent comparative channels and $((i)df$ or $(i+1)df)$ represents the separation factor for comparative channel i. The frequencies of the reference channels can also be different. In some instances, the frequencies of the reference channels increase linearly. For instance, the frequency of reference channel i ($fr_i$) can be $fr_i=f_o+(i)\Delta f$ where $f_o$ represents the frequency of reference channel i=0, $\Delta f$ represents the increase in the separation factor for adjacent reference channels and $(f_o+(i)\Delta f)$ represents the base frequency for comparative channel i and reference channel i.

As noted above, the LIDAR input signals each include preliminary LIDAR data in that at least one characteristic of the LIDAR input signal is a function of the distance and/or radial velocity between the source of a LIDAR output signal and a reflecting object. In contrast, the associated reference channels in the reference signal are not a function of the distance and/or radial velocity between the source of a LIDAR output signal and a reflecting object. Accordingly, the associated reference channels can exclude the preliminary LIDAR data. However, each reference channel includes reference data. For instance, one or more characteristics of each reference channel indicates the value that the corresponding characteristic in the associated LIDAR input signal (the LIDAR input signal having the comparative channel associated with the reference channel) would have if the associated LIDAR input signal had not left the source of the LIDAR output signal and been reflected by a reflecting object. As a result, one or more characteristics of each reference channel provides a reference against which the corresponding characteristic of the associated LIDAR input signal can be measured. For instance, the frequency of each reference channel can be compared against the frequency of the associated LIDAR input signal. Since the frequency of the reference channel represents the frequency that the associated LIDAR input signal would have if it had not exited from the LIDAR chip and been reflected by a reflecting object. As a result, the difference between the frequency of a reference channel and the frequency of the associated LIDAR input signal is a function of the distance and/or radial velocity between the source of the associated LIDAR output signal and a reflecting object. As will be described in more detail below, one method of comparing the frequency of each reference channel against the frequency of the associated LIDAR input signal is to beat the reference channel and the associated comparative channel after reflection of the associated comparative channel.

The LIDAR system also includes a reference signal waveguide 38 that receives the reference signal from the reference light source 36. The reference signal waveguide 36 carries the reference signal to the processing component 34. The LIDAR system also includes a wavelength locker 29 that keeps the frequencies of the reference channels locked to the frequencies of the comparative channels. The wavelength locker 29 can be configured such that a difference in the frequency between a reference channel and the associated comparative channel is maintained when the frequency of a comparative channel is tuned or changes in response to other factors. The frequencies can be locked for all of the channels or only a portion of the channels. For instance, locking the frequency of only one channel may provide the desired control over the frequencies for all of the channels. Suitable wavelength locking techniques include, but are not limited to generation of error signals by splitting the laser signal into a reference and filter path and using the error signal to adjust the laser current to maintain the target wavelength. Suitable filters include but are not limited to, thin film filters, diffraction gratings, and Fabry-Perot etalons.

The signal-directing component 18 can be an optical circulator. The optical circulator is configured such that the outgoing light signal is directed to the LIDAR signal waveguide 24 and the incoming light signal is directed to the comparative signal waveguide 28. Although the signal-directing component 18 of FIG. 1 is disclosed as an optical circulator, the signal-directing component 18 can be an optical coupler or optical switch.

During operation of the LIDAR system, the generation of LIDAR data (the radial velocity and/or the distance between the reflecting object and the source of the LIDAR output signal) is divided into a series of cycles where LIDAR data is generated for each cycle. In some instances, each of the cycles corresponds to a different sample region in a field of view. Accordingly, different cycles can generate LIDAR data for different sample regions in a field of view.

The cycles can be performed such that the time period for each cycle includes one, more than one, two, or more than two sample periods. In one example, the sample periods include at least a first period and a second period. During each sample period, the electronics can tune the frequency of the outgoing LIDAR signal or maintain the frequency of the outgoing LIDAR signal at a constant level. For instance, during the first period, the electronics can increase the frequency of the outgoing LIDAR signal and during a second period the electronics can decrease the frequency of the outgoing LIDAR signal. The frequency of the outgoing LIDAR signal is tuned such that the frequencies for each comparative channel in the outgoing LIDAR signal is tuned away from the base frequency plus the separation factor. Suitable methods for tuning the frequencies of the outgoing LIDAR signal include, but are not limited to, changing the level of electrical current through one or more light sources such as laser(s). Due to the presence of the wavelength locker, tuning the frequencies for each comparative channel in the outgoing LIDAR signal also results in a corresponding level of tuning to the frequencies of the associated reference channels.

Figure 2:
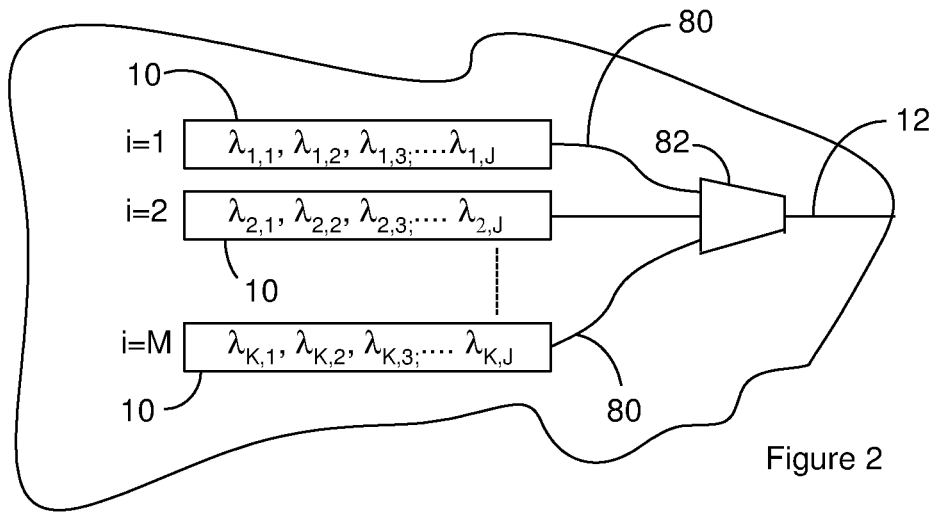
FIG. 2 illustrates multiple light sources configured to generate an outgoing light signal that includes multiple channels.

Although the above LIDAR systems are illustrated as having a single light source as the comparative light source and a single light source as the reference light source, the comparative light source and/or the reference light source light source 10 can each include multiple light sources 10 arranged as illustrated in FIG. 2. The light sources 10 each includes M light sources 10 that each generates K channels. Since the illustrated light source can be a comparative light source and/or the reference light source, the channels illustrated in FIG. 2 are reference channels or are comparative channels. The channels are each received on a channel waveguide 80. The channel waveguides carry the channels to a channel multiplexer 82 that combines the channels so as to form the outgoing light signal that is received on the utility waveguide 12.

In FIG. 2, each of the channels is labeled $\lambda_{kj}$ where k is the number of the light source 10 and is from 1 to K and j is the number of the channel for light source k and is from 1 to J. When the value of J is the same for each light source 10, the total number of channels can be as high as K*J=N+1. As noted above, the light sources 10 can be configured such that the wavelengths of the channels are periodically spaced in that the wavelength increase from one channel to the next channel ($\Delta\lambda$) is constant or substantially constant. In some instances, the light sources 10 are configured such that channels with adjacent wavelengths are generated by different light sources 10. For instance, the light sources 10 can be configured such that $\lambda_{kj}=\lambda_0+(i)(\Delta\lambda)$ where $i=(k-1)+(j-1)(K)$. Suitable light sources 10 for this configuration include, but are not limited to, comb lasers. In this configuration, the channel multiplexer can be a cyclic multiplexer designed with the wavelength spacing ($N*\Delta\lambda$) equal to a multiple of the Free Spectral Range (FSR) of the channel multiplexer. Accordingly, the channel multiplexer can be designed to cycle over the wavelength range ($N*\Delta\lambda$). A suitable cyclic multiplexer includes, but is not limited to, the 'colorless' AWG from Gemfire (8-Channel Cyclic Arrayed Waveguide Grating, 2018).

Suitable values for the number of light sources 10 (K) include, but are not limited to, values greater than or equal to 2, 4, or 8, and/or less than 16, 32, or 64. Suitable values for the number of channels provided by a light sources 10 (J) include, but are not limited to, values greater than or equal to 2, 4, or 8, and/or less than 16, 32, or 64. Suitable values for the wavelength increase from one channel to the next channel ($\Delta\lambda$) include, but are not limited to, values greater than or equal to 0.2 nm, 0.4 nm, or 0.6 nm, and/or less than 0.8 nm, 1.0 nm, or 1.5 nm. Suitable values for the wavelength of the channel with the shortest wavelength include, but are not limited to, values greater than or equal to 1.3 µm, 1.4 µm, or 1.5 µm, and/or less than 1.6 µm, 1.7 µm, or 1.8 µm. In one example, the LIDAR system includes K greater than or equal to 2, 4, or 8, and/or less than 16, 32, or 64; J greater than or equal to 2, 4, or 8, and/or less than 16, 32, or 64; and $\Delta\lambda$, greater than or equal to 0.2 nm, 0.4 nm, or 0.6 nm, and/or less than 0.8 nm, 1 nm, or 1.5 nm.

In some instances, the light sources 10 are configured such that at least a portion of the light sources 10 each generates two or more channels with adjacent wavelengths. For instance, the light sources 10 can be configured such that $\lambda_{kj}=\lambda_o+(i)(\Delta\lambda)$ where $i=(j-1)+(k-1)(J)$. Suitable light sources 10 for this configuration include, but are not limited to, comb lasers. In this configuration, the channel multiplexer can be a broadband multiplexer with a bandwidth of at least $N\Delta\lambda$. Suitable broadband multiplexers include, but are not limited to, arrayed waveguide gratings (AWG) and thin film filters.

Figure 3:
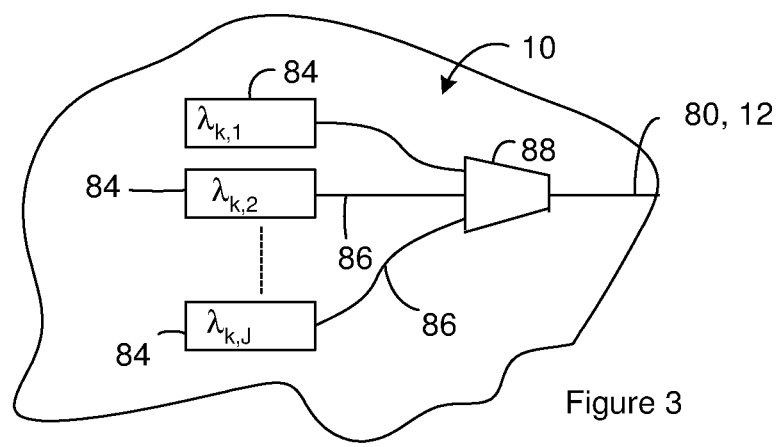
FIG. 3 illustrates a light source that includes multiple laser sources.

As noted above, one or more of the light sources 10 can be a comb laser. However, other constructions of the light source 10 are possible. For instance, FIG. 3 illustrates an example of a light source 10 that includes multiple laser sources 84. The light source 10 illustrated in FIG. 3 includes multiple laser sources 84 that each outputs one of the channels on a source waveguide 86. The source waveguides 86 carry the channels to a laser multiplexer 88 that combines the channels so as to form a light signal that is received on a channel waveguide or the utility waveguide 12. The electronics can operate the laser sources 84 so the laser sources 84 concurrently output each of the channels. Suitable lasers for use with a light source 10 constructed according to FIG. 3 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 4:
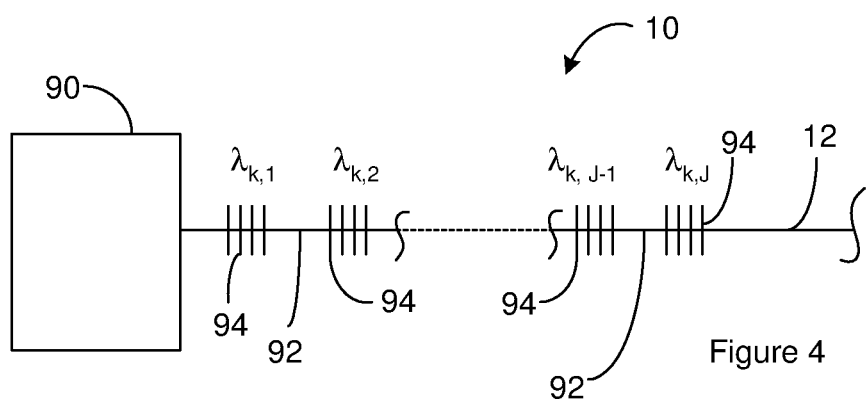
FIG. 4 illustrates one example of a structure configured to generate a light signal that includes multiple channels.

FIG. 4 illustrates another example of a possible light source 10 construction. The light source 10 includes a gain element 90 such as the gain element of a semiconductor laser. A gain waveguide 92 is optically aligned with the gain element so as to receive a light signal from the gain element. In some instances, the gain waveguide excludes the gain medium included in the gain element. For instance, the gain waveguide can be a ridge waveguide on a silicon-on-insulator chip. Multiple partial return devices 94 are positioned along the gain waveguide such that the partial return devices interact with the light signal.

During operation, electronics operate the gain element such that the gain medium outputs the light signal. The partial return devices 94 each passes a portion of the light signal. The portion of the light signal that the utility waveguide 12 receives from the partial return devices serves as the outgoing light signal. The partial return devices also return a portion of the light signal to the gain element such that the returned portion of the light signal travels through the gain element. The gain element can include a fully or partially reflective layer that receives returned portion of the light signal from the gain element and reflects the returned portion of the light signal back to the gain element allowing the returned portion of the light signal to amplify and lase. Accordingly, the light source 10 can be an external cavity laser.

The partial return devices can be configured such that the each partial return device returns a different wavelength of light. For instance, the partial return devices can be configured such that the wavelength of each one of the channels that is to be output by the light source 10 is returned by at least one of the partial return devices. As a result, each of the desired channels will lase and be present in the outgoing light signal. Suitable partial return devices include, but are not limited to, Bragg gratings.

Figure 5A:
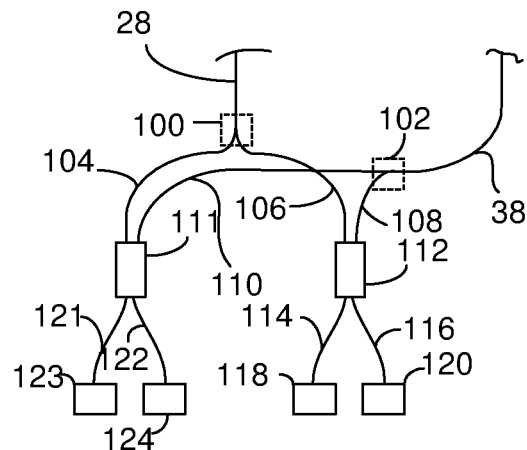
FIG. 5A through FIG. 5C illustrate an example of suitable processing component for use in the above LIDAR systems.
Figure 5B:
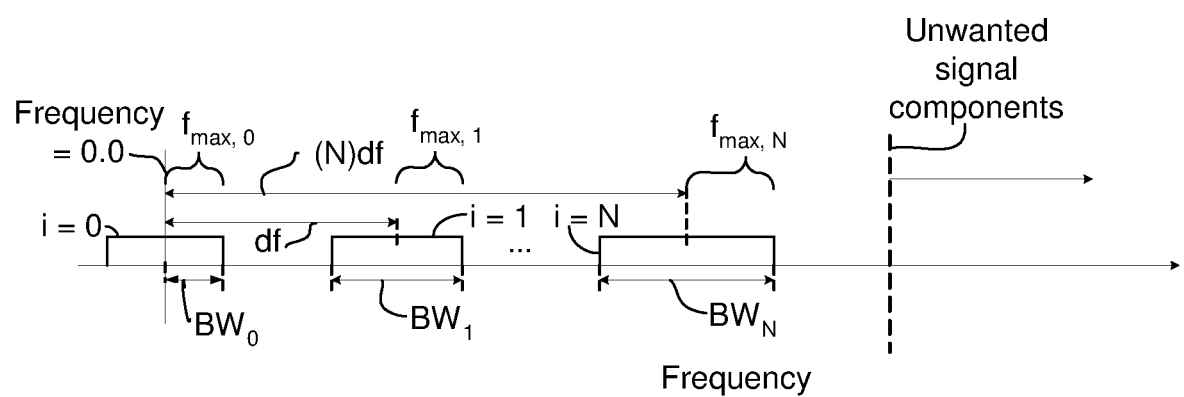
Figure 5C:
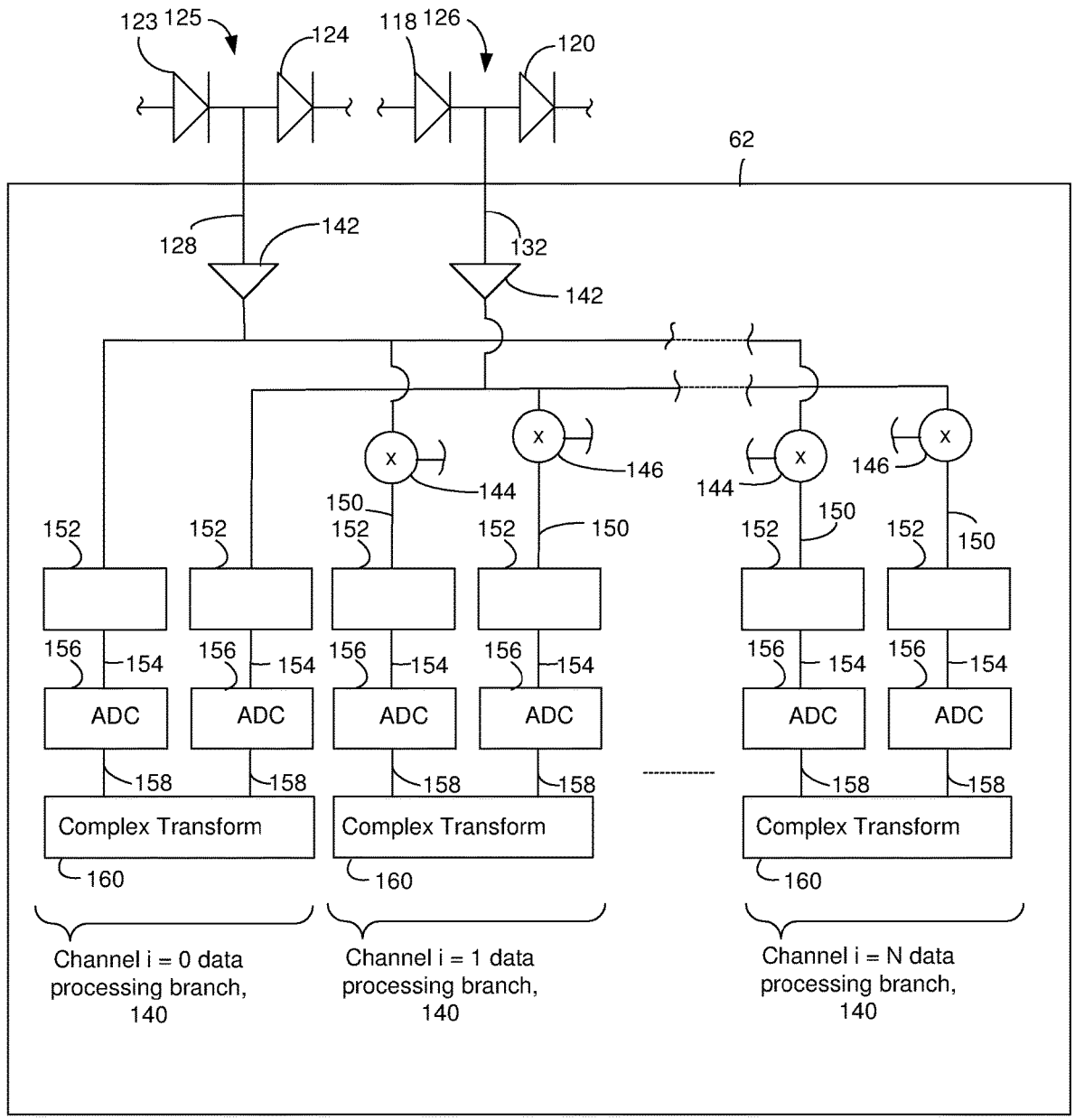

FIG. 5A through FIG. 5C illustrate an example of suitable processing components 34 for use in the above LIDAR systems. A first splitter 102 divides the reference signal carried on the reference signal waveguide 38 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

A second splitter 100 divides the comparative signal carried on the comparative waveguide 28 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the first composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sine function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the comparative signal in the second composite signal and is also phase shifted relative to the portion of the reference signal the in the first composite signal and relative to the portion of the comparative signal the in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 5C provides a schematic of the relationship between the electronics 62, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 5C are included on the LIDAR system. In some instances, the components illustrated in the schematic of FIG. 5C are distributed between the LIDAR system and electronics located off of the LIDAR system.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal.

As a result of the above channel selections, the first data signal and the second data signal include unwanted signal components in addition to desired beat signals. However, the values of $\Delta f$ and $df$ can be selected such that $\Delta f > (4N+1)df/2$ where N+1 represents the number of associated channel pairs for which LIDAR data is to be generated. When $\Delta f > (4N+1)df/2$ the unwanted signal components the first data signal and the second data signal have a frequency above the frequency of the desired beat signals. As a result, filtering can separate the unwanted signal components from the desired beat signals.

FIG. 5B illustrates the relationship between the channels and the frequencies in the first data signal. The desired beat signals associated with different channels appear in separate frequency bands that do not overlap. Each frequency band is associated with a different one of the channels. The frequency band associated with channel i is centered at the frequency $i(df)$. The maximum frequency for channel i is given by $i(df)+f_{max,\,i}$. Accordingly, the maximum frequency for the channel with the highest frequency (Channel i=N) is equal to $(N)(df)+f_{max,\,N}$. To avoid inter-channel interference, the value of df can be selected such that $df > 2*f_{max,\,N}$.

The value of $f_{max,\,i}$ can be determined from $f_{max,\,i}=f_{dmax}+f_{rmax}=f_{dmax,\,i}+\tau_{max}*(B/T)$ where $f_{dmax,\,i}$ represents the maximum frequency shift due to the Doppler effect that channel i should experience in the LIDAR input signal and can be approximated as $\sim 2\times Vmax \times fc_i/c$ where Vmax represents the maximum in the absolute value of radial velocity level that should be seen by the LIDAR system, c represents speed of light, $f_{rmax}$ represents the max frequency shift due to separation between the source of the LIDAR output signal and the reflecting object, B/T represents the rate at which the frequency of channel i is increased or decreased during the data signal period, and $\tau_{max}$ represents the maximum delay that should occur between transmission of a LIDAR output signal and the receipt of the LIDAR input signal. The values of variables such as B, T, $\tau_{max}$, and Vmax can be dependent on the application of the LIDAR system. In general, suitable values include, but are not limited to, B greater than 0.5 GHz and less than 25 GHz, T greater than 0.1 us and less than 10 us, $\tau_{max}$ greater than 0.1 us and less than 2 μs, and Vmax greater than 0.0 m/s and less than 150 m/s. In an example of a self-driving car application, suitable values include, but are not limited to, B greater than 1 GHz and less than 10 GHz, T greater than 1 μs and less than 2 μs, $\tau_{max}$ greater than 0.7 us and less than 1.4 μs, and Vmax greater than 100 m/s and less than 150 m/s. In an example of an Augmented Reality (AR) application, suitable values include, but are not limited to, B greater than 0.5 GHz and less than 5 GHz, T greater than 20 ns and less than 100 ns, $\tau_{max}$ greater than 15 ns and less than 80 μs, and Vmax greater than 0 m/s and less than 0.5 m/s. In some instances, df is greater than 1, 2, or 5 times the value of $2*f_{max,\,N}$.

Although FIG. 5B is disclosed as representing the frequencies in the first data signal, FIG. 5B can also represent the frequencies in the second data signal. Accordingly, the values of $BW_i$ and $f_{max,\,i}$ associated with the first data signal can be the same for the second data signal.

In some instances, the LIDAR data is generated for each of the channels by providing the first data signal to a first Analog-to-Digital Converter (ADC) and the second data signal to a second Analog-to-Digital Converter (ADC). The resulting digital signals can then be provided to a transform module configured to perform a complex transform on a complex signal so as to convert the input from the time domain to the frequency domain. The first data signal can be the real component of the complex signal and the second data signal can be the imaginary component of the complex signal. The transform module can execute the attributed functions using firmware, hardware and software or a combination thereof. The transform converts the input from the time domain to the frequency domain. Accordingly, the transform module can output one or more frequencies that each corresponds to an object in the sample region illuminated by the LIDAR output signal. Each of the different frequencies is used by the electronics as the frequency of the LIDAR input signal. The electronics can use the frequencies for further processing to determine the distance and/or velocity of each of the one or more reflecting objects in the sample region.

One issue with the use of Analog-to-Digital Converters (ADC) on the first data signal and/or on the second data signal may be that the ADC sampling rate required to generate useful results may be impractical to achieve. Another option is to separate the different channels in the first data signal and the second data signal before converting from analog to digital.

FIG. 5C illustrates a schematic for an example of electronics that are suitable for use with a processing unit constructed according to FIG. 5A. The first data line 128 carries the first data signal to N+1 data processing branches 140 that are each associated with one of the channels. As N becomes larger, it may be desirable to place an optional amplifier 142 along the first data line 128 to amplify to the power of the first data signal to a power level that is sufficient power for processing of the first data signal by the N+1 data processing branches 140. The second data line 132 carries the second data signal to the N+1 data processing branches 140 that are each associated with one of the channels. As N becomes larger, it may be desirable to place an optional amplifier 142 along the second data line 138 to amplify to the power of the second data signal to a power level that is sufficient power for processing of the second data signal by the N+1 data processing branches 140.

In the data processing branches 140 for channels i>0, the first data line 128 carries the first data signal to a first multiplier 144 that multiplies the first data signal by a first multiplier signal. The first multiplier signal is selected to shift the frequencies associated with channel i>0 in the first data signal to a lower frequency. In the example of FIG. 5C, the first multiplier signal is selected to shift the frequencies associated with channel i>0 such that the band $BW_i$ is centered at the zero frequency. Accordingly, the first multiplier signal can be represented by $\cos(2\pi(i)(df)t)$. The first multipliers each outputs a first-frequency shifted data signal. Suitable first multipliers include, but are not limited to, RF mixers such as a Gilbert cell mixer.

In the data processing branches 140 for channels i>0, the second data line 132 carries the second data signal to a second multiplier 146 that multiplies the second data signal by a second multiplier signal. The second multiplier signal is selected to shift the frequencies associated with channels i>0 in the second data signal to a lower frequency. In some instances, the frequencies associated with each channel i>0 in the second data signal are shifted to the same frequency as the associated channel i in the first data signal. In the example of FIG. 5C, the second multiplier signal is selected to shift the frequencies associated with channel i>0 such that the band $BW_i$ is centered at the zero frequency. Accordingly, the second multiplier signal can be represented by $\sin((\pi/2)+2\pi(i)(df)t)$. The second multipliers each outputs a second frequency-shifted data signal. Suitable second multipliers include, but are not limited to, RF mixers such as a Gilbert cell mixer.

The first frequency-shifted data signals and the second frequency-shifted data signals are each received on a filter input line 150 that each carries the received signal to a filter 152. In the above discussions, the frequencies associated with channels i>0 are shifted so as to be centered at a frequency of 0.0. However, the frequencies associated with the channel i=0 in the first data signal are already centered at a frequency of 0.0. As a result, the first data line 128 can carry the first data signal to a filter 152 without the first data signal being processed by a multiplier. Additionally, the frequencies associated with the channel i=0 in the second data signal are already centered at a frequency of 0.0. As a result, the second data line 132 carries the second data signal to a filter 152 without the second data signal being processed by a multiplier.

The filters 152 in each data processing branches 140 are configured to pass the frequencies in a frequency band centered at zero-frequency while filtering out other frequency bands. Since the first frequency-shifted data signals in the data processing branch 140 associated with channel i have the frequency band for channel i centered at a zero frequency, each filter 152 outputs a first channel data signal that includes the LIDAR data associated with channel i but does not include or substantially include LIDAR data for the channels below channel i i) or above channel i (>i). Since the second frequency-shifted data signals in the data processing branch 140 associated with channel i have the frequency band for channel i centered at a zero frequency, each filter 152 outputs a second channel data signal that includes the LIDAR data associated with channel i but does not include or substantially include LIDAR data for the channels below channel i i) or above channel i (>i). Suitable filters for use as the first filters and/or second filters include, but are not limited to, lowpass filters because the first frequency-shifted data signals and the second frequency-shifted data signals are centered at zero-frequency.

The first channel data signals and the second channel data signals are each received on an ADC input line 154 that each carries the received signal to an Analog-to-Digital Converter 156 (ADC). According to the Nyquist sampling theorem, the sampling rate for an Analog-to-Digital Converters (ADC) is generally greater than or equal to twice the highest frequency in the signal. Accordingly, if the frequency arrangement were as shown in FIG. 5B, the sampling rate for channel i would be greater than or equal to $2*(i(df)+f_{max, i})$. In FIG. 5B, the signal i would be considered oversampled when the sampling rate is greater than $2*(i(df)+f_{max, i})$ and undersampled when sampling rate is less than $2*(i(df)+f_{max, i})$. However, because the multipliers reduced the frequency of the channels, the frequency band of the first channel data signals and the second channel data signals are not arranged as shown in FIG. 5B but have been reduced such that the highest frequency for each first channel data signal and each second channel data signal is less than or equal to $f_{max, N}$ in FIG. 5B. Accordingly, the sampling rate for each Analog-to-Digital Converter 156 can be greater than or equal to twice $2*f_{max, N}$. As a result, the down conversion provided by the multiplier reduces the sampling rate required for each Analog-to-Digital Converter 156. The Analog-to-Digital Converters 156 that each receives a first channel data signal outputs a first digital data signal. The Analog-to-Digital Converters 156 that each receives a second data signal outputs a second digital data signal. The first digital data signals and the second digital data signals are each received on a digital data line 158. Each digital data line carries the received signal to a transform module 160.

The transform modules 160 are arranged such that each transform modules 160 receives one of the first digital data signals and the associated second digital data signal. Additionally, each of the transform modules 160 is associated with a different one of the channels. The transform modules 160 associated with channel i receives the first digital data signal for channel i and also receives the second digital data signal for channel i.

The transform modules 160 are configured to perform a complex transform on a complex signal so as to convert the input from the time domain to the frequency domain. The first digital data signal can be the real component of the complex signal and the second digital data signal can be the imaginary component of the complex signal. The transform modules can execute the attributed functions using firmware, hardware and software or a combination thereof.

The Complex Fourier transform converts the input from the time domain to the frequency domain and outputs one or more frequencies the each corresponds to an object in the sample region illuminated by the LIDAR output signal. Each of the different frequencies is used by the electronics as a frequency for the LIDAR input signal i. The electronics can use the frequencies for further processing to determine the distance and/or velocity of each of the one or more reflecting objects in the sample region.

The electronics can use the one or more frequencies output from the transform module for channel i to determine the LIDAR data (the radial velocity and/or the distance between a reflecting object in the sample region and the source of the LIDAR output signal) for each of the one or more objects in the sample region illuminated in channel i. For instance, the following equation applies during a sample where electronics increase the frequency of the outgoing LIDAR signal during a sample period: $f_{ub}=-f_{d,\,i}+\alpha^{\tau_0}$ where $f_{ub}$ is the frequency provided by the transform module, $f_{d,\,i}$ represents the Doppler shift ($f_{d,\,i}=2\nu f_{c,\,i}/c$) where $\nu$ is the velocity of the reflecting object relative to the chip where the direction from the reflecting object toward the chip is assumed to be the positive direction, and c is the speed of light, $\alpha$ is the rate at which the frequency is changed during the sample period, and $\tau_0$ is the roundtrip delay between transmission of a LIDAR output signal and receipt of the corresponding LIDAR input signal. The following equation applies during a sample where electronics decrease the frequency of the outgoing LIDAR signal: $f_{db}=-f_{d,\,i}-\alpha^{\tau_0}$ where $f_{db}$ is a frequency provided by the transform module. In these two equations, $f_{d,\,i}$ and $\tau_0$ are unknowns. The electronics solve these two equations for the two unknowns. The radial velocity can then be determined from the Doppler shift and the separation distance can be determined from the $c*\tau_0/2$. Since the LIDAR data can be generated for each of the frequencies output by the transform, separate LIDAR data can be generated for each of the objects in a sample region. Accordingly, the electronics can determine more than one radial velocity and/or more than one radial separation distance from a single sampling of a single sample region in the field of view.

Figure 5D:
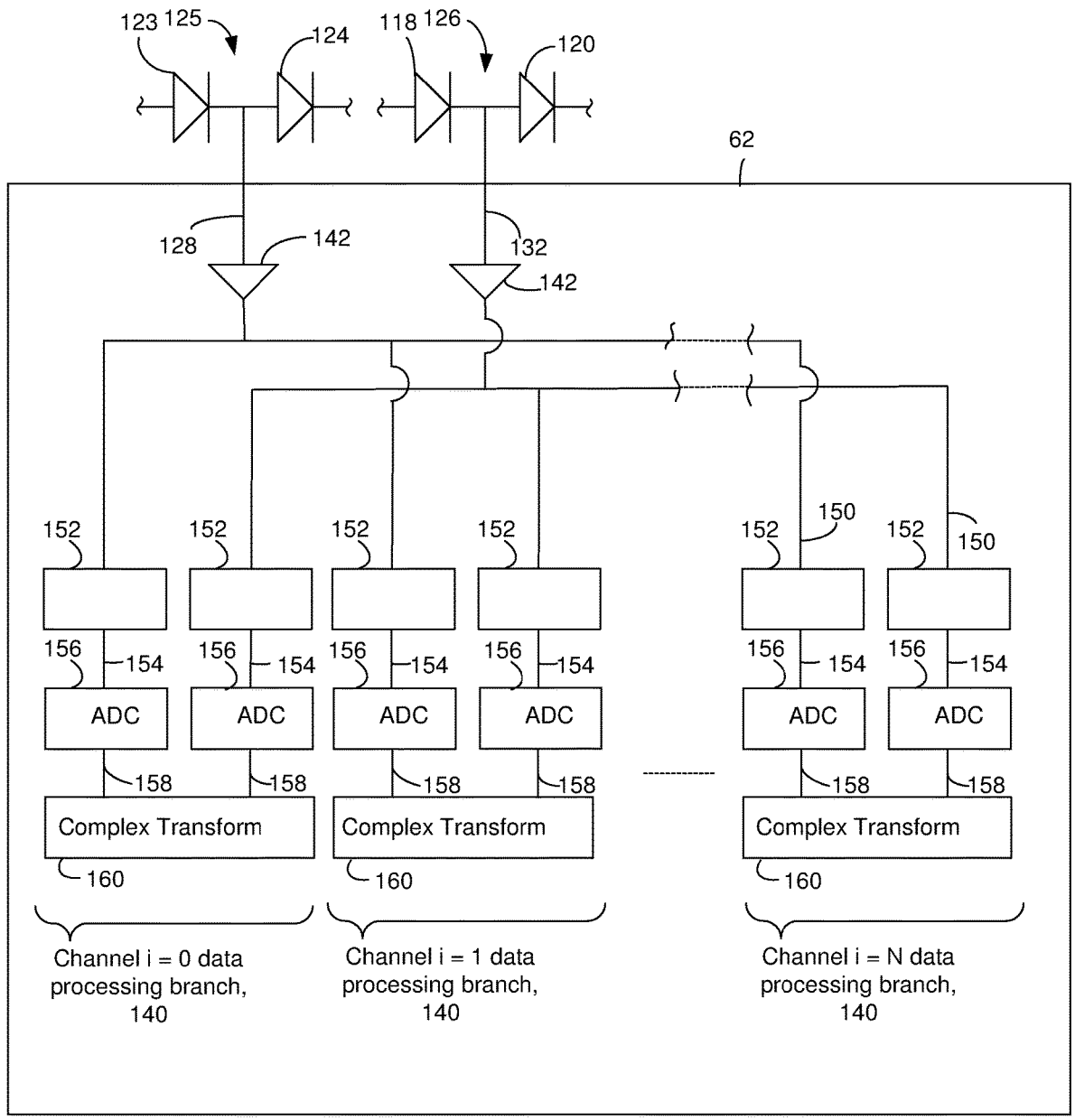
FIG. 5D illustrates a schematic for another example of electronics that are suitable for use with a processing unit constructed according to FIG. 5A.
Figure 6A:
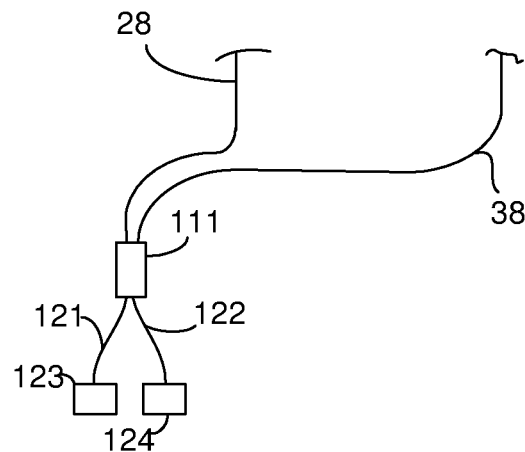
FIG. 6A through FIG. 6C illustrate an example of suitable processing component for use in the above LIDAR systems.
Figure 6B:
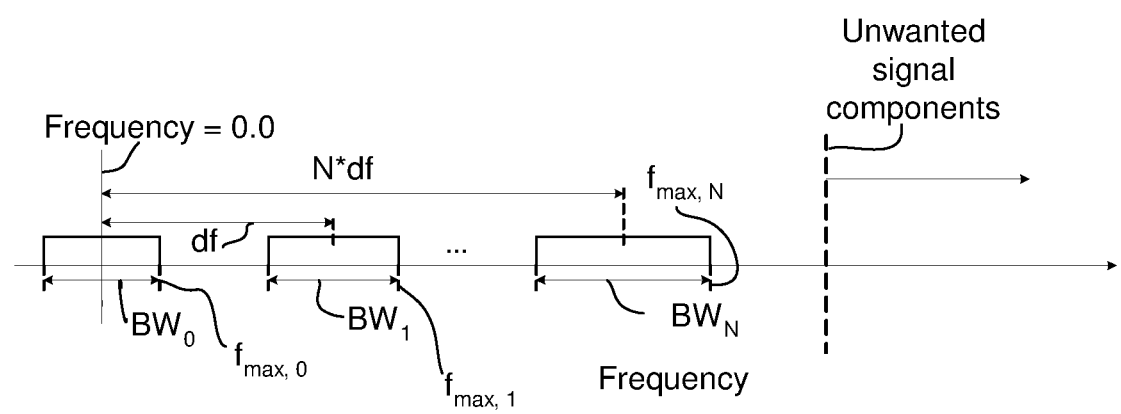
Figure 6C:
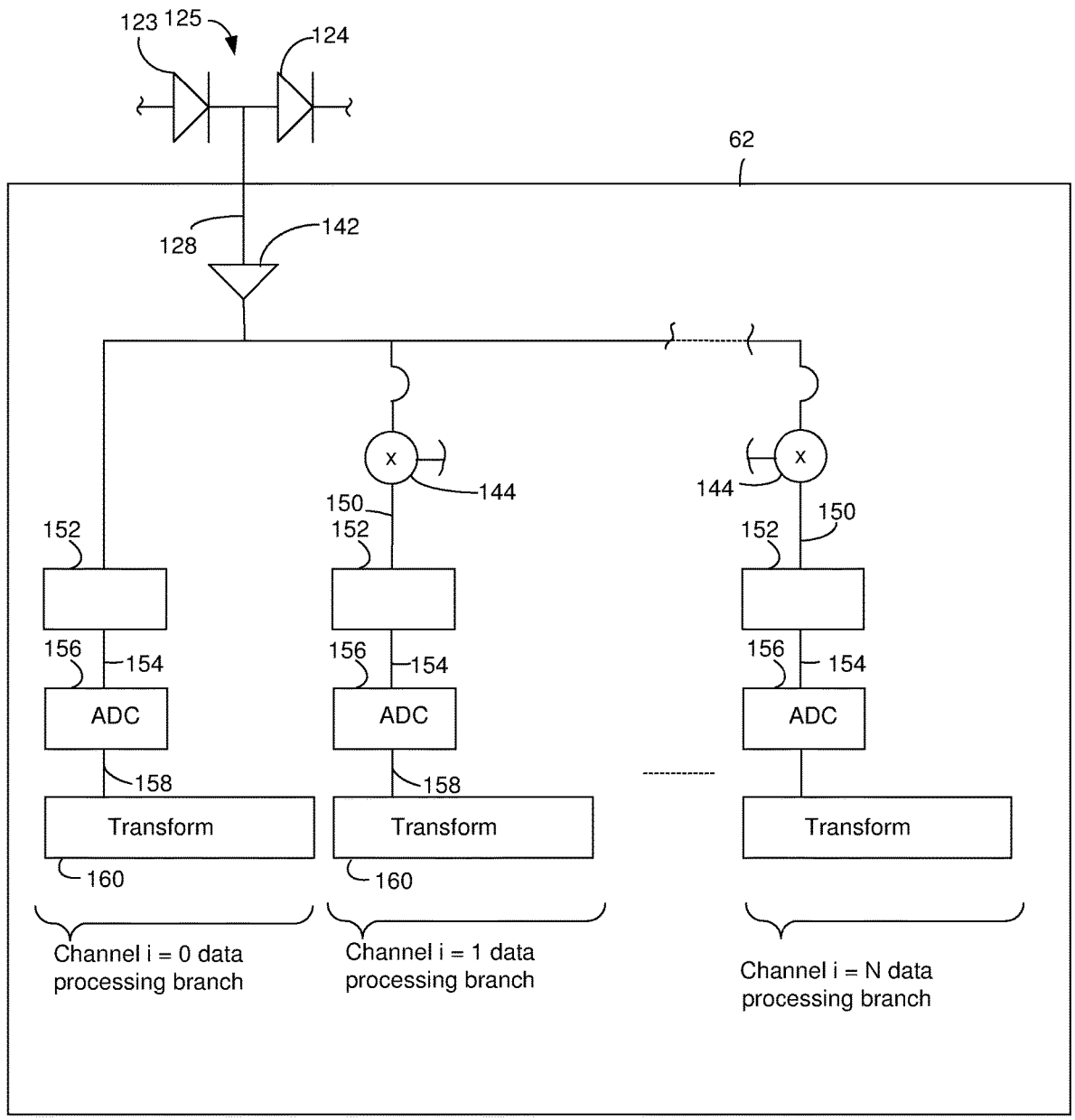
Figure 6D:
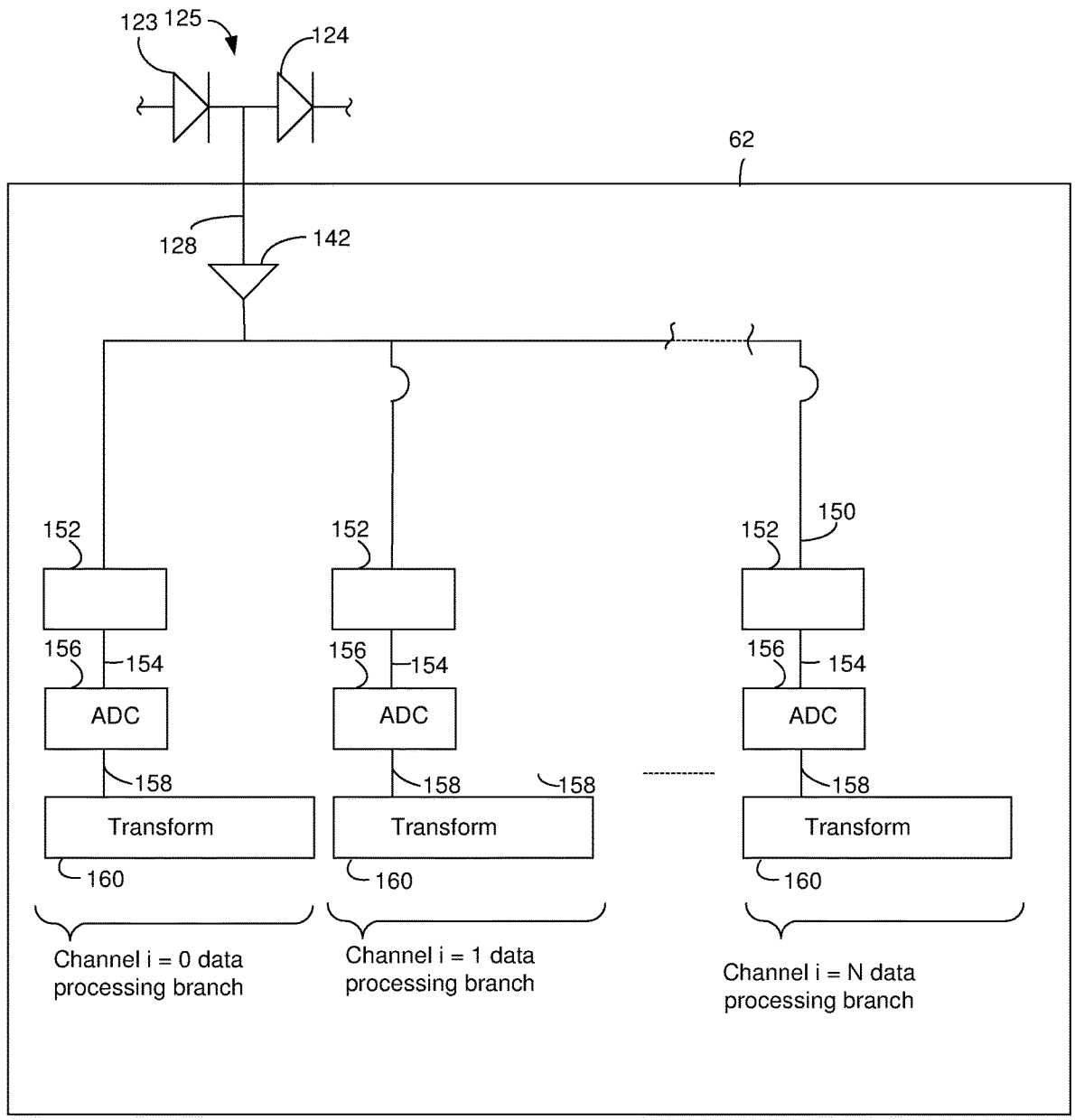
FIG. 6D illustrates a schematic for another example of electronics that are suitable for use with a processing unit constructed according to FIG. 6A.

FIG. 5D illustrates another example of suitable processing components for use in the above LIDAR systems. The first data line 128 carries the first data signal to N+1 data processing branches 140 that are each associated with one of the channels. As N becomes larger, it may be desirable to place an optional amplifier 142 along the first data line 128 to amplify to the power of the first data signal to a power level that is sufficient power for processing of the first data signal by the N+1 data processing branches 140. The second data line 132 carries the second data signal to the N+1 data processing branches 140 that are each associated with one of the channels. As N becomes larger, it may be desirable to place an optional amplifier 142 along the second data line 138 to amplify to the power of the second data signal to a power level that is sufficient power for processing of the second data signal by the N+1 data processing branches 140.

The first data line 128 carries the first data signal to a different filter 152 located in each of the data processing branches 140. Additionally, the second data line 132 carries the second data signal to a different filter 152 located in each of the data processing branches 140. The filters 152 in each data processing branch i are configured to pass the frequencies that fall within bandwidth i ($BW_i$) while filtering out frequencies that fall within bandwidths >i ($BW_{>i}$) and bandwidths <i ($BW_{<i}$). As a result, the filters 152 in data processing branch i that receive a first data signal output a first channel data signal that includes the LIDAR data associated with channel i but does not include or substantially include LIDAR data for the channels below channel i (<i) or above channel i (>i). Additionally, the filter 152 in data processing branch i that receive a second data signal output a second channel data signal that includes the LIDAR data associated with channel i but not include or substantially include LIDAR data for channels below channel i (<i) or above channel i (>i).

Suitable filters 152 for use as the filter 152 in the data processing branch associated with channel i=1 can be a lowpass filter because the frequencies in $BW_i$ are centered around the zero frequency. Suitable filters 152 for use as the filter 152 in the data processing branch associated with channel i>1 can be bandpass filters because the frequencies in $BW_i$ are higher than the zero frequency.

The first channel data signals and the second channel data signals are each received on an ADC input line 154 that each carries the received signal to an Analog-to-Digital Converter 156 (ADC). According to the Nyquist sampling theorem, the sampling rate for an Analog-to-Digital Converters (ADC) is generally greater than or equal to twice the highest frequency in the signal. Accordingly, in FIG. 5B, the signal i would be considered oversampled when the sampling rate is greater than $2*(i(df)+f_{max,\,i})$ and undersampled when sampling rate is less than $2*(i(df)+f_{max,\,i})$. In the system of FIG. 5D, at least a portion of the first channel data signals and the second channel data signals are undersampled. For instance, the Analog-to-Digital Converters (ADC) for the first channel data signals and the second channel data signals associated with at least channels i>0 are undersampled. Undersampling the first channel data signal for channel i causes an ADC to output a first digital signal that includes the frequencies of BWi shifted to the zero-frequency. Undersampling the second channel data signal for channel i causes an ADC to output a second digital signal that includes the frequencies of BWi shifted to the zero-frequency.

The undersampling rate can be selected based on the bandwidth of the channel i=N in the first data signal. For instance, the sampling rate for each Analog-to-Digital Converter 156 can be greater than or equal to $f_{max,\,0}$ and less than or equal to $f_{max,\,N}$. As a result, the electronics of FIG. 5D can reduce the required sampling rates to the levels achieved with the down conversion provided by the electronics of FIG. 5C.

The first digital data signals and the second digital data signals are each received on a digital data line 158. Each digital data line carries the received signal to a transform module 160. The transform modules 160 are arranged and operated as disclosed in the FIG. 5A through FIG. 5C to generate LIDAR data for each of the channels.

In some instances, a simplified version of the processing components 34 can be employed. For instance, FIG. 6A through FIG. 6D illustrate simplified processing components 34 that are suitable for use with the above LIDAR systems. The comparative signal carried on the comparative waveguide 28 and the reference signal carried on the reference signal waveguide 38 are carried to a light-combining component 111. The light-combining component 111 operates as disclosed above and outputs the first portion of the first composite signal and the second portion of the first composite signal as disclosed above. The remaining components operate on the first portion of the first composite signal and the second portion of the first composite signal as disclosed in the context of FIG. 5A through FIG. 5D to generate the first digital data signals that are each associated with one of the channels. The first digital data signals are each received on a digital data line 158. Each digital data line carries the received signal to a transform module 160.

The transform modules 160 can perform a real transform on the first digital data signals so as to convert the input from the time domain to the frequency domain. Examples of suitable transforms include a real Fourier transform that converts the input from the time domain to the frequency domain. The transform can output multiple frequency peaks and the electronics can select which frequency peaks to be used as representing the frequency of the LIDAR input signal for comparative channel i. The electronics use the selected frequency for further processing to determine the LIDAR data. The processing components 34 disclosed in the context of FIG. 6A through FIG. 6D are most suitable for use when the source of the LIDAR signal and reflecting object have a radial velocity and radial separation within known ranges and the frequency solutions within those ranges have results that allow the correct frequency solutions to be selected.

The above balanced detectors can be replaced with other light sensors that convert light signals to electrical signals. For instance, a single photodiode or other light sensor can serve as one or more of the above balanced detectors. In these instances, the associated light-combining components need not split the composite signal(s) into multiple portions. Alternately, the light signals can be converted to electrical signals earlier than is illustrated above. As a result, the electronics can combine electrical signals so as to form an electrical equivalent to the composite signal(s) disclosed above.

Figure 7:
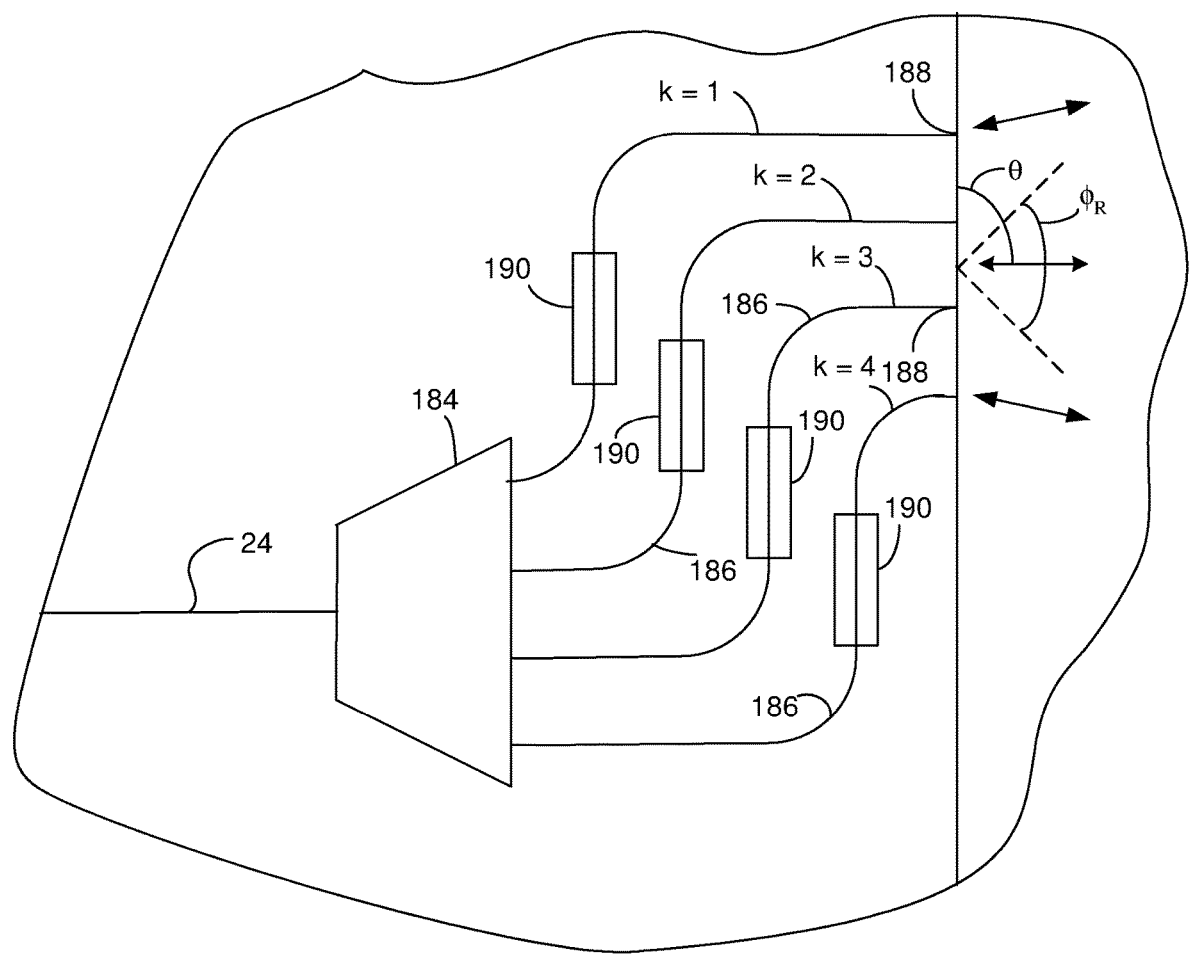
FIG. 7 illustrates an example of a demultiplexing component that includes beam steering capability.

FIG. 7 illustrates an example of a suitable demultiplexing component 26 that includes beam steering capability. The demultiplexing component 26 includes a splitter 184 that receives the outgoing light signal from the LIDAR signal waveguide 24. The splitter divides the outgoing light signal into multiple output signals that are each carried on a steering waveguide 186. Each of the steering waveguides ends at a facet 188. The facets are arranged such that the output signals exiting the chip through the facets combine to form the LIDAR output signal.

The splitter and steering waveguides can be constructed such that there is not a phase differential between output signals at the facet of adjacent steering waveguides. For instance, the splitter can be constructed such that each of the output signals is in-phase upon exiting from the splitter and the steering waveguides can each have the same length. Alternately, the splitter and steering waveguides can be constructed such that there is a linearly increasing phase differential between output signals at the facet of adjacent steering waveguides. For instance, the steering waveguides can be constructed such that the phase of steering waveguide number j is $f_o+(j-1)f$ where j is an integer from 1 to L and represents the number associated with a steering waveguide when the steering waveguides are sequentially numbered as shown in FIG. 7, f is the phase differential between neighboring steering waveguides when the phase tuners (discussed below) do not affect the phase differential, and $f_o$ is the phase of the output signal at the facet of steering waveguide j=1. Because the channels can have different wavelengths, the values of f and $f_o$ can each be associated with one of the channels. In some instances, this phase differential is achieved by constructing the steering waveguides such that the steering waveguides have a linearly increasing length differential. For instance, the length of steering waveguide j can be represented by $l_o+(j-1)\Delta l$ where $\Delta l$ is the length differential between neighboring steering waveguide, and $l_o$ is the length of steering waveguide j=1.

Because $\Delta l$ is a different percent of the wavelength of different channels included in the output signals, each of the different LIDAR output signals travels away from LIDAR chip in a different direction ($\theta$). When the steering waveguides are the same length, the value of $\Delta l$ is zero and the value off is zero. Suitable $\Delta l$ include, but are not limited to, $\Delta l$ greater than 0, or 5 and/or less than 10, or 15 µm. Suitable f include, but are not limited to, f greater than $0\pi$, or $7\pi$ and/or less than $15\pi$, or $20\pi$. Suitable L include, but are not limited to, L greater than 10, or 500 and/or less than 1000, or 2000. Suitable splitters include, but are not limited to, star couplers, cascaded Y-junctions and cascaded 1×2 MMI couplers.

A phase tuner 190 can be positioned along at least a portion of the steering waveguides. Although a phase tuner is shown positioned along the first and last steering waveguide, these phase tuners are optional. For instance, the chip need not include a phase tuner on steering waveguide j=1.

The electronics can be configured to operate the phase tuners so as to create a phase differential between the output signals at the facet of adjacent steering waveguides. The electronics can operate the phase tuners such that the phase differential is constant in that it increases linearly across the steering waveguides. For instance, electronics can operate the phase tuners such that the tuner-induced phase of steering waveguide number k is $(k-1)\alpha$ where k is an integer from 1 to M and represents the number associated with a steering waveguide when the steering waveguides are sequentially numbered as shown in FIG. 7, $\alpha$ is the tuner-induced phase differential between neighboring steering waveguides. Accordingly, the phase of steering waveguide number k is $f_o+(j-1)f+(j-1)\alpha$. FIG. 7 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners so as to tune the value of the phase differential $\alpha$. Tuning the value of the phase differential $\alpha$ changes the direction that the LIDAR output signal travels away from the chip ($\theta$). Accordingly, the electronics can scan the LIDAR output signal by changing the phase differential $\alpha$. The range of angles over which the LIDAR output signal can be scanned is $\phi_R$ and, in some instances, extends from $\phi_v$ to $-\phi_v$ with $\phi=0°$ being measured in the direction of the LIDAR output signal when $\alpha=0$. When the value of $\Delta l$ is not zero, the length differential causes diffraction such that light of different wavelengths travels away from chip in different directions ($\theta$). Accordingly, there may be some spreading of the outgoing LIDAR signal as it travels away from the chip. Further, changing the level of diffraction changes the angle at which the outgoing LIDAR signal travels away from the chip when $\alpha=0°$. However, providing the steering waveguides with a length differential ($\Delta l \neq 0$) can simplify the layout of the steering waveguides on the chip.

Additional details about the construction and operation of a demultiplexing component 26 constructed according to FIG. 7 can be found in U.S. Provisional Patent Application Ser. No. 62/680,787, filed on Jun. 5, 2018, and incorporated herein in its entirety.

Although the above LIDAR systems disclose the frequency of each comparative channel as equal to the frequency of the corresponding reference channel plus a separation factor, the above LIDAR systems can also be operated with the reverse channel frequency assignments. For instance, the frequency of each reference channel can be equal to the frequency of the corresponding comparative channel plus the separation factor. As an example, the frequency of reference channel with channel index i ($fr_i$) can be $fr_i=fc_i+(i)df$ or $fr_i=fc_i+(i+1)$ the frequency of comparative channel i ($fc_i$) can be $fc_1=f_o+(i)\Delta f$.

The reference channels can each be associated with one of the comparative channels. The comparative channel and the associated reference channel can be an associated channel pair that are each associated with the same channel index i. The frequency of each comparative channel can be equal to the frequency of the corresponding reference channel plus a separation factor that can be positive or negative. As a result, the reference channel and the associated comparative channel have the same base frequency. The separation factor is selected to be different for each pair of associated channels. For instance, the frequency of comparative channel with channel index i ($fc_i$) can be $fc_i=fr_i+(i)df$ or $fc_i=fr_i+(i+1)df$ where i is an integer greater than or equal to 0, $fr_i$ represents the frequency of reference channel i, df represents the increase in the separation factor for adjacent comparative channels and ((i)df or (i+1)df) represents the separation factor for comparative channel i. The frequencies of the reference channels can also be different. In some instances, the frequencies of the reference channels increase linearly. For instance, the frequency of reference channel i ($fr_i$) can be $fr_i=f_o+(i)\Delta f$ where $f_o$ represents the frequency of reference channel i=0, $\Delta f$ represents the increase in the separation factor for adjacent reference channels and ($f_o+(i)\Delta f$) represents the base frequency for comparative channel i and reference channel i.

The above disclosure uses channel assignments that start channel i=0 through channel N for a total of N+1 channels. However, the channel indices can be shifted. For instance, the channel index can be configured such that the channels start at channel n=1 through channel N+1 for a total of N+1 channels. Such a shift can be performed by substituting i=n−1 into the above equations.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a reference light source configured to output an outgoing reference light signal that includes multiple reference channels, each of the reference channels having a different frequency ($fr_i$) that can be represented by $fr_i=f_o+(i)\Delta f$ where i represents a channel index that starts at 0 and increases by 1 to a value of N, $f_o$ represents the frequency of reference channel i=0, and $\Delta f$ is a constant;
a comparative light source configured to output an outgoing light signal that includes multiple comparative channels, each of the comparative channels having a different frequency ($fc_i$) that can be represented by $fc_i=fr_i+(i)df+OS$ or $fc_i=fr_i+(i+1)df$ where OS is a constant that can be equal to zero, and $\Delta f>(4N+1)df/2$; and
optical components configured to generate a composite signal that includes light from multiple different reference channels combined with light from multiple different comparative channels.

2. The system of claim 1, wherein the reference channels do not exit from the LIDAR system before being included in the composite signal and the comparative channels exit from the LIDAR system and return to the LIDAR system before being included in the composite signal.

3. The system of claim 1, further comprising electronics that include multiple electrical lines and are configured to generate an electrical composite signal from the composite signal and to separate the electrical composite signal into multiple electrical LIDAR data signals that each carries the LIDAR data from a different one of the comparative channels, the electrical LIDAR data signals being separated such that different electrical LIDAR data signals are each carried on a different one of the electrical lines.

4. A LIDAR system, comprising:
optical components configured to generate a composite signal that includes light from multiple different reference channels combined with light from multiple different comparative channels,
each of the comparative channels carries LIDAR data as a result of the comparative channel being reflected by one or more objects located apart from the LIDAR system, the LIDAR data indicating a distance and/or radial velocity between the source of a LIDAR output signal and the one or more reflecting objects,
each of the reference channels do not include light reflected by the one or more objects, and
each of the reference channels being associated with a different one of the comparative channels such that each reference channel and the associated comparative channel is a channel pair,
each channel pair is associated with a channel indice i that starts at 0 and increases by 1 to a value of N; and
electronics that convert the composite signal to an electrical composite signal,
each of the channel pairs in the electrical composite signal beating at a beat frequency such that the beat frequencies from different channel pairs occur in different frequency bands that do not overlap one another,
each frequency band being centered at a value of i(df) where df is a constant,
the frequency of each reference channel i ($fr_i$) is represented by $fr_i=f_o+(i)\Delta f$ where $f_o$ represents the frequency of reference channel i=0 and $\Delta f$ is a constant, and $\Delta f>(4N+1)df/2$.

5. The device of claim 4, wherein a frequency of each comparative channel i ($fc_i$) is represented by $fc_i=fr_i+(i)df+OS$ or $fc_i=fr_i+(i+1)df$ where OS is a constant that can be equal to zero.

6. The device of claim 4, wherein the electronics are configured to separate an electrical signal into multiple electrical LIDAR data signals that each carries the LIDAR data from a different one of the comparative channels.

7. The device of claim 5, wherein the electronics include multiple electrical lines and the electrical LIDAR data signals are separated such that different electrical LIDAR data signals are carried on different electrical lines.

8. The device of claim 7, wherein each electrical LIDAR data signal includes preliminary LIDAR data generated from a comparative channel associated with channel index i and excludes preliminary LIDAR data from any comparative channels associated with a channel index less than i and also excludes preliminary LIDAR data from any comparative channels associated with a channel index greater than i, and
each electrical LIDAR data signal includes reference data generated from a reference channel associated with channel index i and excludes reference data from any reference channels associated with a channel index less than i and also excludes preliminary LIDAR data from any reference channels associated with a channel index greater than i.

9. The system of claim 4, wherein the optical components are included on a LIDAR chip.

10. The system of claim 9, wherein the LIDAR chip includes a silicon-on-insulator platform.

11. The system of claim 9, wherein the reference channels do not exit from the LIDAR chip before being included in the composite signal and the comparative channels exit from the LIDAR system before being included in the composite signal.

12. The system of claim 4, further comprising:
a reference light source configured to generate an outgoing light signal that includes the reference channels; and
a comparative light source configured to generate an outgoing light signal that includes multiple comparative channels, the comparative channel and the associated reference channel having different frequencies.

13. The system of claim 4, wherein the electronics generate the LIDAR data in a series of cycles, each cycle includes multiple sample periods and during a portion of the sample periods a frequency of the comparative channels is changed at a constant rate a.

14. The system of claim 13, wherein the each of the cycles includes a first one of the sample periods where a frequency of the comparative channels is increased and a second one of the sample periods where a frequency of the comparative channels is decreased.

15. The system of claim 14, wherein a wavelength locker keeps frequencies of the reference channels locked to frequencies of the comparative channels.

16. The system of claim 7, wherein the electronics include multiple analog-to-digital converters and each of the analog-to-digital converters receives a different one of the electrical LIDAR data signals.

17. The system of claim 16, wherein at least a portion of the electrical LIDAR data signals are undersampled by the analog-to-digital converter that receives the electrical LIDAR data signal.

18. The system of claim 16, wherein each of the analog-to-digital converters outputs a digital version of the electrical LIDAR data signals as a digital data signal.

19. The system of claim 17, wherein the electronics perform a fourier transform on each of the digital data signals.

20. The system of claim 17, wherein the electronics perform a complex fourier transforms on complex digital data signals where each of the digital data signals serves as the real components or the complex component of the complex digital data signal.

21. A LIDAR system, comprising:
a comparative light source that outputs an outgoing light signal that carries N+1 different comparative channels that are each at a different frequency, the
a reference light source that outputs a reference signal that carries multiple different reference channels that are each at a different frequency,
optical components configured to generate a composite signal that includes light from multiple different reference channels combined with light from multiple different comparative channels,
each of the comparative channels carries LIDAR data as a result of the comparative channel being reflected by one or more objects located apart from the LIDAR system, the LIDAR data indicating a distance and/or radial velocity between the source of a LIDAR output signal and the one or more reflecting objects,
each of the reference channels do not include light reflected by the one or more objects, and
each of the reference channels being associated with a different one of the comparative channels such that each reference channel and the associated comparative channel is a channel pair,
each channel pair is associated with a channel indice i that starts at 0 and increases by 1 to a value of N; and
electronics that convert the composite signal to an electrical composite signal,
each of the channel pairs in the electrical composite signal beating at a beat frequency such that the beat frequencies from different channel pairs occur in different frequency bands that do not overlap one another,
each frequency band being centered at a value of i(df) where df is a constant,
the frequency of each reference channel i ($fr_i$) is represented by $fr_i = f_o + (i)\Delta f$ where $f_o$ represents the frequency of reference channel i=0 and $\Delta f$ is a constant, and $\Delta f > (4N+1)df/2$.

* * * * *